(12) United States Patent
Morita et al.

(10) Patent No.: US 7,771,525 B2
(45) Date of Patent: Aug. 10, 2010

(54) WATER-SOLUBLE AZO COMPOUND OR SALT THEREOF, INK COMPOSITION AND COLORED PRODUCT

(75) Inventors: Ryoutarou Morita, Kita-ku (JP); Yoshiaki Kawaida, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/312,113

(22) PCT Filed: Oct. 25, 2007

(86) PCT No.: PCT/JP2007/070809

§ 371 (c)(1),
(2), (4) Date: Apr. 27, 2009

(87) PCT Pub. No.: WO2008/053776

PCT Pub. Date: May 8, 2008

(65) Prior Publication Data

US 2010/0068475 A1     Mar. 18, 2010

(30) Foreign Application Priority Data

Nov. 1, 2006    (JP)    ............... 2006-297422

(51) Int. Cl.
C09D 11/02    (2006.01)
C09B 33/12    (2006.01)
B41J 2/01     (2006.01)

(52) U.S. Cl. ............. 106/31.48; 534/797; 347/100
(58) Field of Classification Search ......... 106/31.48; 534/797; 347/100; 428/195.1
See application file for complete search history.

(56) References Cited

U.S. PATENT DOCUMENTS

| | | | |
|---|---|---|---|
| 3,945,990 A * | 3/1976 | Ikeda et al. | 534/797 |
| 5,268,459 A | 12/1993 | Gregory et al. | 534/758 |
| 5,374,301 A | 12/1994 | Gregory et al. | 106/31.48 |
| 5,519,121 A * | 5/1996 | Renner et al. | 106/31.48 |
| 5,622,550 A | 4/1997 | Konishi et al. | 106/31.48 |
| 5,631,352 A | 5/1997 | Lauk | 534/797 |
| 6,290,763 B1 | 9/2001 | Millard et al. | 106/31.48 |
| 6,867,286 B1 * | 3/2005 | Holloway et al. | 534/797 |
| 7,029,503 B2 * | 4/2006 | Odani et al. | 8/549 |
| 7,056,374 B2 * | 6/2006 | Kitayama et al. | 106/31.48 |
| 7,150,783 B2 * | 12/2006 | Oshaughnessy et al. | 106/31.48 |
| 7,163,576 B2 * | 1/2007 | Oshaughnessy et al. | 106/31.48 |
| 7,387,668 B2 * | 6/2008 | Kitayama et al. | 106/31.48 |
| 7,553,358 B2 * | 6/2009 | Okamura et al. | 106/31.48 |
| 2004/0068102 A1 | 4/2004 | Holloway | 534/632 |
| 2005/0115458 A1 * | 6/2005 | Oki et al. | 106/31.48 |
| 2006/0005744 A1 * | 1/2006 | Kitayama et al. | 106/31.48 |
| 2008/0274285 A1 * | 11/2008 | Okamura et al. | 106/31.48 |
| 2009/0117341 A1 | 5/2009 | Takahashi et al. | 428/195.1 |
| 2009/0130399 A1 | 5/2009 | Takahashi et al. | 428/195.1 |
| 2010/0068475 A1 * | 3/2010 | Morita et al. | 106/31.48 |

FOREIGN PATENT DOCUMENTS

| | | |
|---|---|---|
| GB | 595181 | 11/1947 |
| JP | 55-135166 | 10/1980 |
| JP | 4-233975 | 8/1992 |
| JP | 8-3469 | 1/1996 |
| JP | 8-325493 | 12/1996 |
| JP | 2005-298636 | 10/2005 |
| JP | 2006-152244 | 6/2006 |
| JP | 2008-13667 | 1/2008 |
| JP | 2008-56830 | 3/2008 |
| JP | 2008-88281 | 4/2008 |
| JP | 2008-88282 | 4/2008 |
| WO | 98/12263 | 3/1998 |
| WO | 2004/007619 | 1/2004 |
| WO | 2007/049366 | 5/2007 |

OTHER PUBLICATIONS

International Search Report dated Mar. 20, 2006 (PCT/JP2006/301059; in co-pending U.S. Appl. No. 11/990,210).
International Search Report dated Mar. 20, 2006 (PCT/JP2005/024117; in co-pending U.S. Appl. No. 12/083,536).
International Search Report dated Dec. 4, 2007.
International Search Report dated Jul. 29, 2008 in co-pending U.S. Appl. No. 12/451,071.

* cited by examiner

Primary Examiner—Helene Klemanski
(74) Attorney, Agent, or Firm—Nields, Lemack & Frame, LLC

(57) ABSTRACT

The present invention relates to a water-soluble azo compound or a salt thereof represented by the following formula (1):

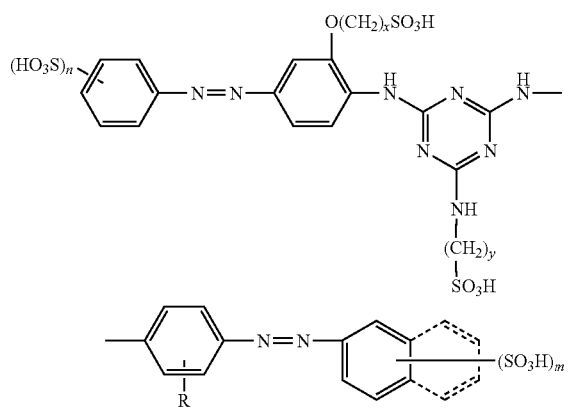

(wherein, R represents a hydrogen atom, an alkyl group having 1 to 4 carbon atoms, an alkoxy group having 1 to 4 carbon atoms or a sulfo group, n, m, x and y represent an integer of 1 or 2, 1 to 3, 2 to 4 and 1 to 3, respectively.) and an ink composition containing the same; the above compound or a salt thereof has a hue possessing a high vividness suitable for inkjet recording, provides various fastnesses to recorded matters, and is useful as a yellow coloring matter excellent in storage stability when prepared into an ink composition, and suitable for ink compositions, especially inks for inkjet recording.

14 Claims, No Drawings

WATER-SOLUBLE AZO COMPOUND OR SALT THEREOF, INK COMPOSITION AND COLORED PRODUCT

TECHNICAL FIELD

The present invention relates to a water-soluble azo compound or a salt thereof, an ink composition containing the same and a colored product colored therewith.

BACKGROUND ART

For the recording method by means of an inkjet printer which is one of the typical methods among various color recording methods, various methods for discharging ink have been developed, and in any of the methods, ink droplets are generated and adhered onto various record-receiving materials (such as paper, film and cloth) to perform recording. This method has been rapidly prevailing lately and is expected to continue growing remarkably in the future because of features such as quietness without noise generation due to no direct contact of the recording head with a record-receiving material and as easiness in downsizing, speedup and colorization. Conventionally, as an ink for fountain pens, felt-tip pens or the like and as an ink for inkjet recording, water-based inks where a water-soluble dye is dissolved in an aqueous medium have been used, and in these water-based inks, a water-soluble organic solvent is generally added to prevent ink from clogging at a pen tip or an inkjet nozzle. These inks are required to provide recorded images with a sufficient density, not to clog at a pen tip or a nozzle, to dry quickly on a record-receiving material, to bleed less, to have an excellent stability in storage, and so on. In addition, recorded images formed are required to have fastnesses such as water fastness, moisture fastness, light fastness and gas fastness.

In an inkjet printer, nozzle clogging often occurs because a coloring matter is precipitated as crystals when evaporation of the water in the ink near the nozzle leads to the state where the water content is smaller and the solvent and additive content is larger. Therefore, it is one of the very important required performances that crystal precipitation is hardly occurred even in such a condition. For this reason, a coloring matter having a higher water-solubility is required which is free from crystal precipitation even in the above condition.

In addition, in order to record images or character information on a color display of a computer in color by an inkjet printer, subtractive color mixing of 4 color inks of yellow (Y), magenta (M), cyan (C) and black (K) is generally used. By this method, images are recorded in color. In order to reproduce, as faithfully as possible, images expressed by additive color mixing of red (R), green (G) and blue (B) on CRT (cathode ray tube) displays and the like through images by subtractive color mixing, it is desired that coloring matters used in ink, particularly each of Y, M and C has a hue as close to each standard as possible and also vividness. In addition, it is required that the ink to be used for them are stable in storage for a long period of time, and that images printed in the above manner have a high concentration and are also excellent in fastnesses such as water fastness, moisture fastness, light fastness, and gas fastness. The gas fastness herein means durability against the phenomenon where oxidizing gases having oxidizing effect, such as nitrogen oxide gas, ozone gas, and the like, which exist in the air are reacted with a coloring matter (dye) of a recorded image on or in a recorded paper, resulting in discoloration or fading of printed images. In particular, the ozone gas is regarded as a main causative matter promoting the color fading phenomenon of inkjet recorded images. This discoloration or fading phenomenon is a characteristic of inkjet images and therefore improvement of ozone gas fastness is an important technical challenge in this field.

In order to obtain photo image quality, some inkjet special papers as one of recording papers are provided with an ink receiving layer on the surface thereof. For this ink receiving layer, porous white inorganic substance is often used so as to dry the ink quickly and reduce ink blurring in high image quality. Discoloration or fading by ozone gas prominently appears particularly on such a recording paper. As is described in Non-Patent Literature 1, NOx gas and SOx gas as an oxidizing gas other than ozone gas are also regarded to have a large effect on discoloration phenomenon of printed matters. In particular, $NO_2$ gas exists in the atmosphere in a relatively large amount and therefore the effect thereof cannot be ignored. With recent spread of digital cameras and color printers, there are also more opportunities at home to print images obtained using a digital camera and the like into photo image quality, and image discoloration by these oxidizing gases in the air during storage of print matters obtained is often regarded as a problem together with ozone gas fastness.

C.I. (color index) Direct Yellow 132 is cited as a yellow coloring matter for an inkjet which is excellent in water-solubility and vividness. Use examples thereof are disclosed in Patent Literatures 1 to 3.

In addition, an azo-based yellow coloring matter having high fastnesses for inkjet recording is disclosed in Patent Literature 4.

Non-Patent Literature 1: Japan Hardcopy, 2004, Article Collection, pp. 73 to 80

Patent Literature 1: JP H 11-70729

Patent Literature 2: JP 2000-154344, Examples A1 to 5

Patent Literature 3: JP 2003-34763, Table 1-1 (Example 4)

Patent Literature 4: JP 2006-152244

DISCLOSURE OF THE INVENTION

Problems to be Solved by the Invention

C.I. Direct Yellow 132 is not necessarily satisfying all the properties such as hue, vividness, various fastnesses such as light fastness and storage stability. It is not necessarily satisfying in terms of, for example, moisture fastness, ozone gas fastness, solubility and the like. Meanwhile, the yellow coloring matter described in Patent Literature 4 possesses various fastnesses such as light fastness in a very high level, but there is a problem that the color density is slightly insufficient. Therefore, in order to provide a color density above a certain level, the concentration of the coloring matter (solid content) in ink has to be increased, which is thus a problem. Increase of the concentration of coloring matter in ink leads not only to cost-up of ink but also to increased possibility of precipitation of coloring matter, resulting in that the problems of blocking at a nozzle orifice and the like are apt to arise. For that reason, high color density is one of the very important physical properties required. Consequently, it has been required to develop a yellow coloring matter having fastnesses, color density, hue, vividness and the like which are further improved.

It is an object of the present invention to provide a water-soluble yellow coloring matter (compound) which has a high solubility in water, hue and vividness suitable for inkjet recording and a high color density, and enables a recorded matter excellent in fastnesses such as water fastness, moisture fastness, gas fastness and particularly light fastness, and an ink composition containing it which has a good storage stability.

Means of Solving the Problems

The present inventors have intensively studied to solve the above problems and found that a water-soluble disazo compound represented by the following formula (1) and an ink composition containing it can solve the above problems, and have now completed the present invention.

That is, the present invention relates to:

(1) A water-soluble azo compound represented by the following formula (1) or a salt thereof,

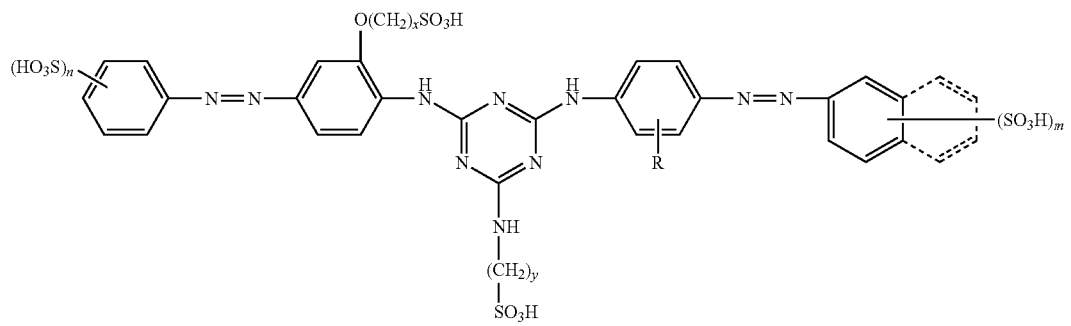

(1)

(wherein, R represents a hydrogen atom, an alkyl group having 1 to 4 carbon atoms, an alkoxy group having 1 to 4 carbon atoms or a sulfo group, n represents an integer number of 1 or 2, m represents an integer number of 1 to 3, x represents an integer number of 2 to 4 and y represents an integer number of 1 to 3, respectively)

(2) The water-soluble azo compound or the salt thereof according to the above (1), which is represented by the following formula (2),

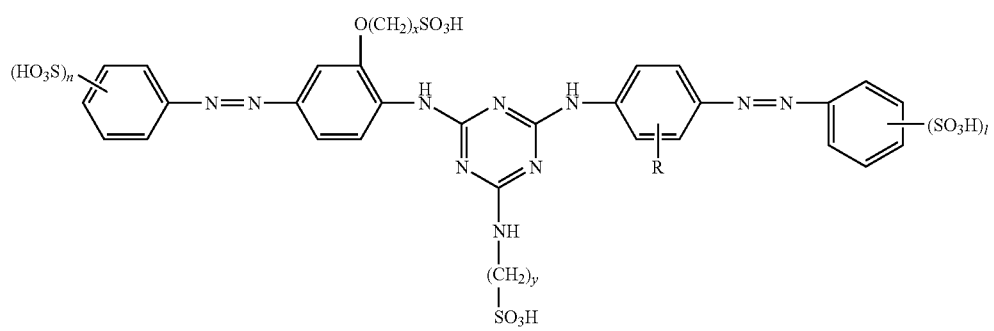

(2)

(wherein, R represents a hydrogen atom, an alkyl group having 1 to 4 carbon atoms, an alkoxy group having 1 to 4 carbon atoms or a sulfo group, n represents an integer number of 1 or 2, l represents an integer number of 1 or 2, x represents an integer number of 2 to 4 and y represents an integer number of 1 to 3, respectively)

(3) The water-soluble azo compound or the salt thereof according to the above (2), wherein in the formula (2), R is a hydrogen atom, a methyl group, a methoxy group or a sulfo group, l is 1 or 2, n is 1, x is 3 and y is 2, (4) The water-soluble azo compound or the salt thereof according to the above (2), which is represented by the following formula (3),

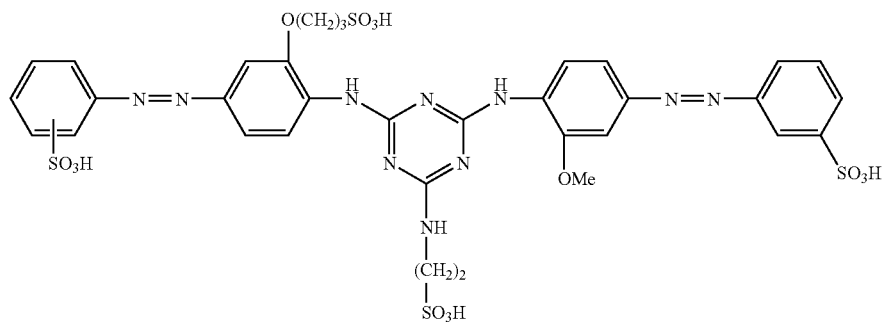

(3)

(wherein, OMe represents a methoxy group)

(5) An ink composition containing the water-soluble azo compound or the salt thereof according to any one of the above (1) to (4), (6) The ink composition according to the above (5), which contains a water-soluble organic solvent, (7) The ink composition according to the above (5) or (6), which is for inkjet recording, (8) An inkjet recording method characterized by using the ink composition according to any one of the above (5) to (7) as an ink in an inkjet recording method where ink drops are discharged responding to a recording signal to conduct recording on a record-receiving material, (9) The inkjet recording method according to the above (8), wherein the record-receiving material is a communication sheet,

(10) The inkjet recording method according to the above (9), wherein the communication sheet is a sheet having an ink receiving layer containing a porous white inorganic substance,

(11) A colored product colored with the water-soluble azo compound according to any one of the above (1) to (4) or the ink composition according to any one of the above (5) to (7),

(12) The colored product according to the above (11), wherein coloring is performed by an inkjet printer,

(13) An inkjet printer wherein a container containing the ink composition according to any one of the above (5) to (7) is installed,

(14) The water-soluble azo compound or the salt thereof according to Claim 1, wherein in the above (1), the phenyl group having a condensed ring shown by a dotted line which is substituted by $(SO_3H)m$ is a 2-naphthyl group.

EFFECT OF THE INVENTION

The water-soluble azo compound represented by the above formula (1) of the present invention or salts thereof is extremely excellent in solubility in water, compared with the conventional products. In addition, it has a characteristic of good filtration property with, for example, a membrane filter during the production process of an ink composition and imparts a yellow hue which is very vivid on an inkjet recording paper and high in brightness and color density. Further, the ink composition of the present invention containing this compound is free from crystal precipitation and changes in physical properties and hue after storage for a long period of time, and thus has an extremely good stability in storage compared with the conventional products. Furthermore, by using the ink composition of the present invention as an ink for inkjet recording, printed matters can exhibit an ideal hue as yellow hue without selecting a record-receiving material (for example, paper, film and the like), and also photo-like color images can be faithfully reproduced on a paper. Moreover, even if recording is carried out on a record-receiving material where a porous white inorganic substance is coated on the surface thereof, such as inkjet special paper for photo image quality or film, the recorded product is good in various fastnesses, i.e. water fastness, moisture fastness, gas fastness and particularly light fastness, and the photo-like recorded images are excellent in long-term storage stability. Thus, the water-soluble azo compound of the formula (1) is extremely useful as a yellow coloring matter for ink, specifically for ink for inkjet recording.

BEST MODE FOR CARRYING OUT THE INVENTION

The present invention will be specifically explained. In this connection, unless otherwise specified in the present description, acidic functional groups such as a sulfo group and a carboxy group are shown in free acid form.

In addition, hereinafter unless otherwise specified in the present description, the term "the water-soluble azo compound of the present invention or a salt thereof" is referred to as "the coloring matter of the present invention" or "the coloring matter of the formula (1)", for convenience. Further, "RTM" indicated in superscription means "registered trademark"

The coloring matter of the present invention is represented by the following formula (1) in free form:

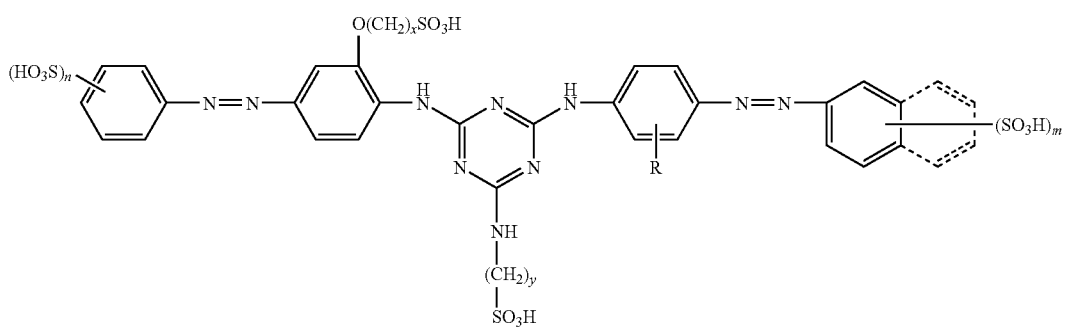

(wherein, R represents a hydrogen atom, an alkyl group having 1 to 4 carbon atoms, an alkoxy group having 1 to 4 carbon atoms or a sulfo group, n represents an integer number of 1 or 2, m represents an integer number of 1 to 3, x represents an integer number of 2 to 4 and y represents an integer number of 1 to 3, respectively).

Meanwhile, in the formula (1) and the like in the present description, the phenyl group having a condensed ring shown by a dotted line which is substituted by $(SO_3H)m$ represents a phenyl group or a naphthyl group.

In addition, the following terms and symbols used in the present description, compounds of the formula (1), and the like will be more specifically explained hereinafter.

Preferable examples of the alkyl group having 1 to 4 carbon atoms (or (C1 to C4) alkyl group described afterward) include methyl, ethyl, n-propyl, isopropyl, n-butyl, isobutyl, 1-methylpropyl and t-butyl. More preferable one is typically a methyl group.

Preferable examples of the alkoxy group having 1 to 4 carbon atoms (or (C1 to C4) alkoxy group described afterward) include methoxy, ethoxy, n-propoxy, isopropoxy, n-butoxy, isobutoxy, 1-methylpropoxy and t-butoxy. More preferable is typically a methoxy group.

Preferable examples of R include a hydrogen atom, a methyl group, a methoxy group or a sulfo group.

m represents 1 to 3, and preferably 1 or 2. Further preferably, m is 1 when $(SO_3H)m$ is substituted on the phenyl group, and m is 2 when $(SO_3H)m$ is substituted on the naphthyl group.

n is 1 or 2, and preferably 1.

x is 2 to 4, and preferably 3.

y is 1 to 3, and preferably 2.

One of preferable compounds of the above formula (1) is a compound of the above formula (2). Preferable is a compound of the formula (2) wherein x is 3, y is 2, and R is methyl, methoxy or sulfo, preferably methyl or methoxy and more preferably methoxy. In this case, the substitution position of R is preferably the meta-position to the azo group. In addition, in this case, more preferable is a compound where l (small letter of L) is 1 and n is 1. Further, the substitution positions of $(SO_3H)n$ group and $(SO_3H)l$ group may be respectively any of the ortho-, meta- and para-positions to the azo group, preferably the meta-position or the para-position, more preferably at least either one is the meta-position and further preferably the both are the meta-positions. Particularly preferable is a compound of the above formula (3).

The compound of the formula (1) wherein the phenyl group having a condensed ring shown by a dotted line which is substituted by $(SO_3H)m$ is a 2-naphthyl group substituted by $(SO_3H)m$ is also one of preferable compounds. In this case, preferable is a compound wherein x is 3, y is 2, and R is hydrogen, methyl, methoxy or sulfo, preferably hydrogen, methyl or sulfo and more preferably hydrogen or methyl. In this case, more preferable is a compound wherein n is 1 and m is 2 or 3 and preferably 2. $(SO_3H)n$ group is preferably at the meta-position or the para-position to the azo group and more preferably at the meta-position.

The substitution position of $(SO_3H)m$ on the naphthyl group is preferably the 4- and 8-positions or the 6- and 8-positions when the bonding position of the naphthyl group to the azo group is the 2-position and m is 2.

In the present invention, the compound represented by the above formula (1) in free form may be a free acid or a salt thereof, any of which is included in the present invention. Examples of the salt of the compound of the above formula (1) include salts with an inorganic or organic cation. Specific examples of the salt with an inorganic cation include alkali metal salts, for example, a salt with lithium, sodium or potassium. On the other hand, specific examples of the salt with an organic cation include, for example, a salt with a quaternary ammonium ion represented by the following formula (4). The salt of the compound of the above formula (1) is however not limited thereto.

(4)

(wherein, each of $Z^1$ to $Z^4$ independently represents a hydrogen atom, a (C1 to C4) alkyl group, a hydroxy (C1 to C4) alkyl group or a hydroxy (C1 to C4) alkoxy (C1 to C4) alkyl group)

Herein, examples of the alkyl group for $Z^1$ to $Z^4$ include methyl, ethyl and the like, and examples of the hydroxyalkyl group include hydroxymethyl, hydroxyethyl, 3-hydroxypropyl, 2-hydroxypropyl, 4-hydroxybutyl, 3-hydroxybutyl, 2-hydroxybutyl and the like. In addition, examples of the hydroxyalkoxyalkyl group include hydroxyethoxymethyl, 2-hydroxyethoxyethyl, 3-(hydroxyethoxy)propyl, 3-(hydroxyethoxy)butyl, 2-(hydroxyethoxy)butyl and the like.

Preferable examples of the above salts include salts of sodium, potassium, lithium, monoethanolamine, diethanolamine, triethanolamine, monoisopropanolamine, diisopropanolamine or triisopropanolamine, ammonium salts, and the like. Among them, particularly preferable are lithium salts, sodium salts, and ammonium salts.

As is apparent to those skilled in the art, a salt of the compound of the above formula (1) can be easily obtained by the following method or the like.

For example, sodium chloride is added to an aqueous solution of the compound of the formula (1) (for example, a reaction solution containing the compound of the formula (1) obtained by synthesis, specifically a reaction solution before adding 800 parts of acetone for precipitation of the compound of the formula (1) in Example 1; or an aqueous solution dissolving a wet cake containing the compound of the formula (1) or the compound of the formula (1) in dried form) for salting out and the resulting precipitation solid is separated by filtration to obtain a sodium salt of the compound of the above formula (1) as a wet cake.

In addition, the obtained wet cake of sodium salt is dissolved in water and then an acid such as hydrochloric acid is added thereto for properly adjusting the pH to precipitate a solid, which is then separated by filtration to obtain a free acid of the compound of the above formula (1) or a mixture of free acid and sodium salt thereof (a mixture where some of the compound of the formula (1) is sodium salt).

Further, while stirring the wet cake in free acid of the compound of the formula (1) together with water, for example, potassium hydroxide, lithium hydroxide, ammonia water or an aqueous ammonium solution of the formula (4) (or amine corresponding thereto) is added to make it alkaline in order to obtain each corresponding potassium salt, lithium salt, ammonium salt or quaternary ammonium salt. By adjusting the kind or the mole number of the above base to be added relative to the mole number of the free acid, it is also possible to obtain, for example, a mixed salt of lithium and sodium, or the like and further a mixed salt of lithium, sodium and ammonium, or the like. For the salt of the compound of the above formula (1), the physical properties thereof such as solubility or the ink performance in the case of using as an ink may be changed according to the kind of salt. For this reason, the kind of the salt is preferably selected according to the ink performance.

Among these salts, particularly preferred are lithium, sodium and ammonium salts as described above.

The above "coloring matter of the formula (1)" of the present invention can be produced, for example, as follows. In this connection, R, m, n, x and y which are appropriately used in the following formulas (A) to (H) have the same meanings as in the above formula (1), respectively.

The compound of the following formula (A) obtained by reference to the examples described in Japanese publication No. 2004-75719 A is converted to methyl-ω-sulfonic acid derivative (B) by using sodium bisulfite and formalin. Subsequently, in the conventional manner, an aminobenzenesulfonic acid represented by the following formula (C) is diazotized, and the resulting diazotized compound and the previously obtained methyl-ω-sulfonic acid derivative of the formula (B) undergo coupling reaction at 0 to 15° C. and pH 2 to 4, followed by hydrolyzation reaction at 80 to 95° C. and pH 10.5 to 11.5 to obtain a compound of the following formula (D).

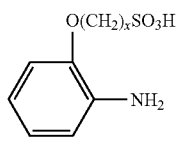

(A)

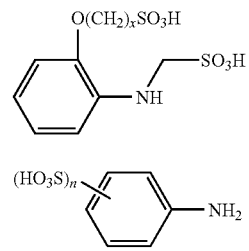

(B)

(C)

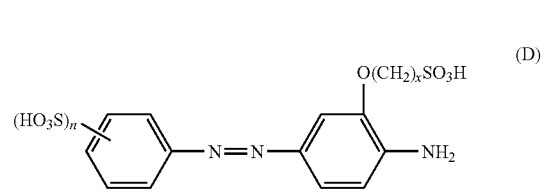

(D)

In the same manner as above except that the following formula (E) is used instead of the above formula (A) and the following formula (F) is used instead of the above formula (C), a compound of the following formula (G) can be obtained.

(E)

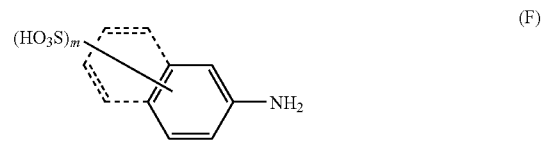

(F)

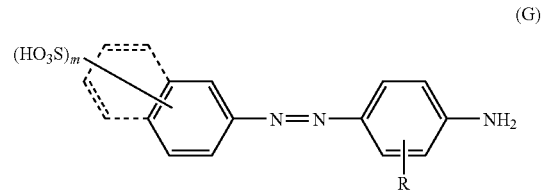

(G)

Next, the above obtained compound (1 equivalent) of the formula (D) and a cyanuric halide, e.g., cyanuric chloride are condensed at a temperature of 0 to 15° C. under weak acidity (typically at pH 5 to 6) to obtain a compound of the following formula (H). Subsequently, the compound (1 equivalent) of the formula (G) and the compound of the formula (H) are condensed at a temperature of 20 to 35° C. under weak acidity (typically at pH 6 to 7) to obtain a compound of the following formula (I).

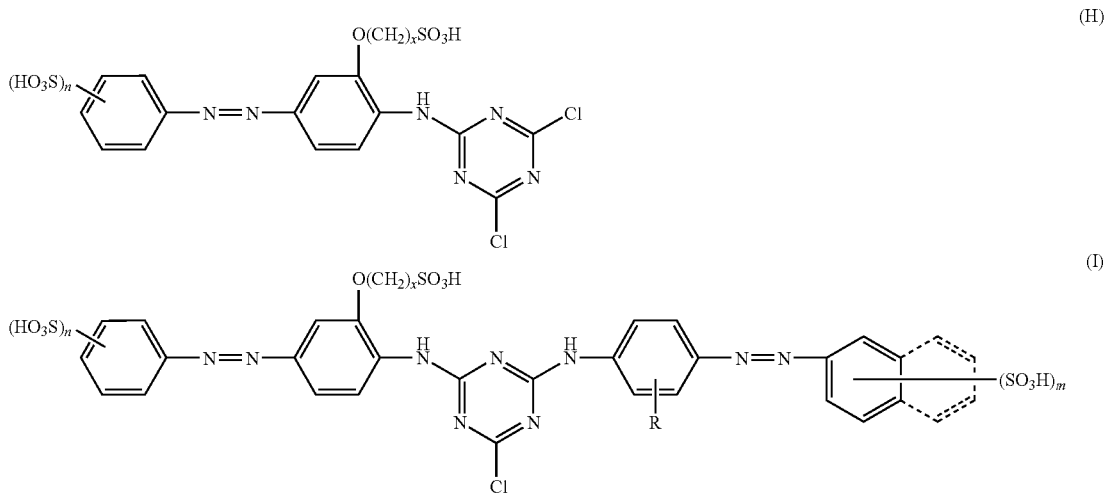

Further, the obtained compound of the above formula (I) is reacted with a compound of the following formula (J) under the conditions of preferably 75 to 80° C. and pH 7 to 9 to substitute the chlorine atom in the compound of the formula (I) and thereby a coloring matter of the present invention represented by the above formula (1) can be obtain.

$$H_2N-(CH_2)_y-SO_3H \qquad (J)$$

Specific examples of the compound of the formula (A) include 2-sulfoethoxyaniline, 2-sulfopropoxyaniline and 2-sulfobutoxyaniline, and specific examples of the compound of the formula (C) include, for example, 4-aminobenzenesulfonic acid, 3-aminobenzenesulfonic acid, 2-aminobenzenesulfonic acid, 4-aminobenzene-1,3-disulfonic acid, 3-aminobenzene-1,4-disulfonic acid and the like.

In addition, specific examples of the compound of the formula (E) include, for example, aniline, 3-methylaniline, 2-methylaniline, 2-methoxyaniline, 3-methoxyaniline and the like, and specific examples of the compound of the formula (F) include 4-aminobenzenesulfonic acid, 3-aminobenzenesulfonic acid, 2-aminobenzenesulfonic acid, 2-aminonaphthalene-4,8-disulfonic acid, 2-aminonaphthalene-5,7-disulfonic acid, 2-aminonaphthalene-6,8-disulfonic acid, 2-aminonaphthalene-4,6,8-trisulfonic acid and the like.

Further, specific examples of the compound of the above formula (J) include aminomethylsulfonic acid, taurine, and homotaurine.

Preferable specific examples of the coloring matter of the present invention are shown in the following Table 1. In Table 1, the sulfo groups are shown in free acid form.

TABLE 1

| Compound No. | R | m | n | x | y | Structural Formula |
|---|---|---|---|---|---|---|
| 1 | MeO | 1 | 1 | 2 | 2 | |
| 2 | MeO | 1 | 1 | 3 | 2 | |

TABLE 1-continued

| Compound No. | R | m | n | x | y | Structural Formula |
|---|---|---|---|---|---|---|
| 3 | MeO | 1 | 1 | 4 | 2 | |
| 4 | MeO | 1 | 1 | 3 | 1 | |
| 5 | MeO | 1 | 1 | 3 | 3 | |
| 6 | MeO | 1 | 1 | 3 | 2 | |
| 7 | MeO | 1 | 1 | 3 | 2 | |
| 8 | MeO | 1 | 2 | 3 | 2 | |

TABLE 1-continued

| Compound No. | R | m | n | x | y | Structural Formula |
|---|---|---|---|---|---|---|
| 9 | MeO | 1 | 2 | 3 | 2 | |
| 10 | MeO | 1 | 1 | 3 | 2 | |
| 11 | MeO | 1 | 1 | 3 | 2 | |
| 12 | Me | 1 | 1 | 3 | 2 | |
| 13 | Me | 1 | 1 | 3 | 2 | |
| 14 | Me | 1 | 1 | 3 | 2 | |

TABLE 1-continued

| Compound No. | R | m | n | x | y | Structural Formula |
|---|---|---|---|---|---|---|
| 15 | H | 1 | 1 | 3 | 2 | |
| 16 | H | 1 | 1 | 3 | 2 | |
| 17 | H | 1 | 1 | 3 | 2 | |
| 18 | SO3H | 1 | 1 | 3 | 2 | |
| 19 | SO3H | 1 | 1 | 3 | 2 | |
| 20 | H | 3 | 1 | 3 | 2 | |

TABLE 1-continued

| Compound No. | R | m | n | x | y | Structural Formula |
|---|---|---|---|---|---|---|
| 21 | H | 2 | 1 | 3 | 2 | |
| 22 | H | 2 | 1 | 3 | 2 | |
| 23 | H | 2 | 2 | 3 | 2 | |
| 24 | H | 2 | 2 | 3 | 2 | |
| 25 | H | 2 | 1 | 3 | 2 | |
| 26 | H | 2 | 1 | 3 | 2 | |

TABLE 1-continued
| Compound No. | R | m | n | x | y | Structural Formula |
|---|---|---|---|---|---|---|
| 27 | H | 2 | 2 | 3 | 2 | 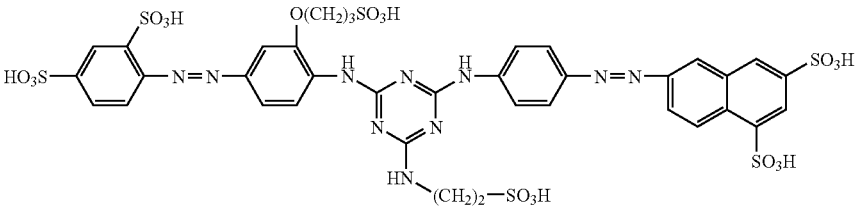 |
| 28 | H | 2 | 2 | 3 | 2 | 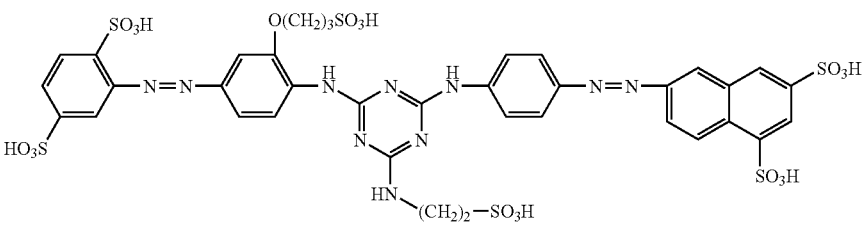 |
| 29 | H | 2 | 1 | 3 | 2 | 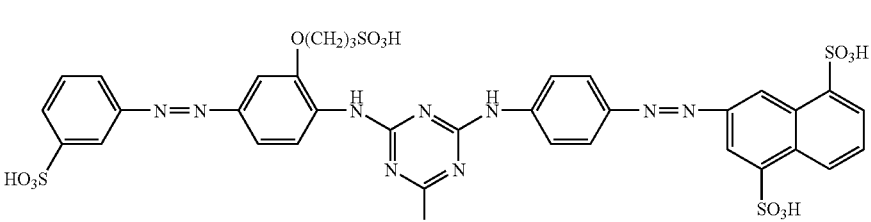 |
| 30 | H | 2 | 1 | 3 | 2 | 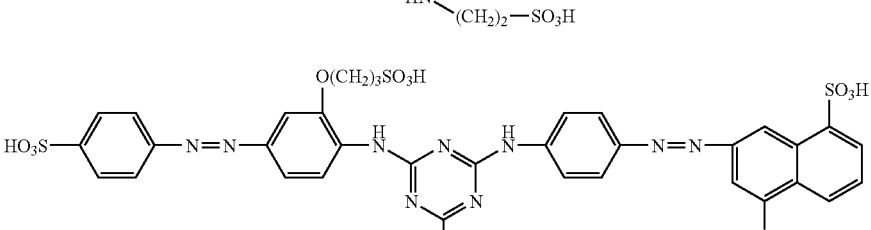 |
| 31 | H | 2 | 2 | 3 | 2 | 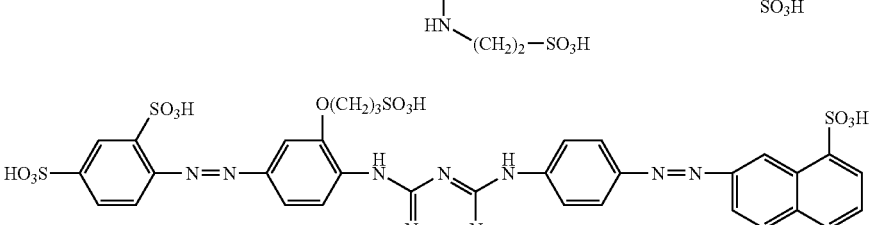 |
| 32 | H | 2 | 2 | 3 | 2 | 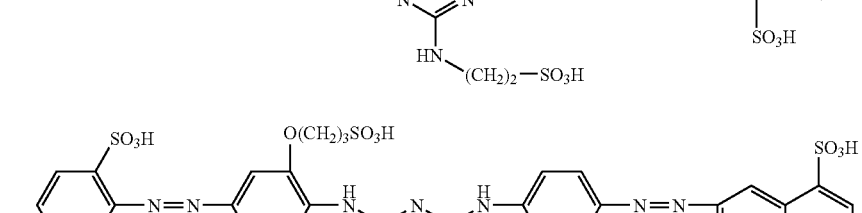 |

TABLE 1-continued

| Compound No. | R | m | n | x | y | Structural Formula |
|---|---|---|---|---|---|---|
| 33 | MeO | 2 | 1 | 3 | 2 | |
| 34 | Me | 2 | 1 | 3 | 2 | |
| 35 | H | 1 | 1 | 3 | 2 | |

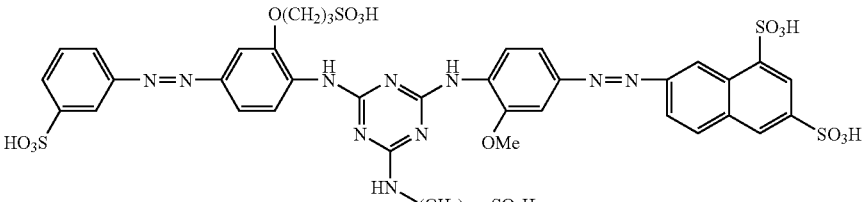

The coloring matter of the formula (1) of the present invention can be obtained as a solid free acid by addition of a mineral acid such as hydrochloric acid after the coupling reaction, which is then washed with, for example, water or acid water such as hydrochloric acid-water to remove away inorganic salts contained as impurity, for example, sodium chloride, sodium sulfate and the like.

The free acid of the coloring matter of the present invention obtained as above is reacted with a desired inorganic or organic base in an aqueous medium to obtain a solution of a corresponding salt. In this connection, the aqueous medium typically means a mixed solution of a water-soluble organic solvent and water. However, a basic substance, for example, such as urea which is transformed into an aqueous solution by mixing with water can be used as a medium for the above base treatment though not typically classified as an organic solvent. Therefore, the term "aqueous medium" described in the present description optionally includes an aqueous solution of such a substance.

Examples of the inorganic base include, for example, alkali metal hydroxides such as lithium hydroxide, sodium hydroxide and potassium hydroxide, alkali metal carbonates such as lithium carbonate, sodium carbonate and potassium carbonate, ammonium hydroxides, and the like.

Examples of the organic base, for example, amines producing a quaternary ammonium ion represented by the above formula (4) in an aqueous solution, for example, alkanolamines such as diethanolamine and triethanolamine, and the like. However, the inorganic or organic bases are not limited thereto.

The coloring matter of the present invention can be dissolved or dispersed in an aqueous medium or the like to use for dyeing natural and synthetic textile materials or blends and for coloring various products. In addition, it is suitable for production of inks for writing and ink compositions for inkjet recording.

The reaction liquid containing the coloring matter of the formula (1) of the present invention (for example, a reaction liquid before adding 800 parts of acetone in Example 1 described later) may be directly used in production of the ink composition of the present invention. However, said compound is typically separated from the reaction liquid to obtain a compound, which is used in production of said ink composition. For example, a wet or dried cake of the coloring matter of the formula (1) obtained by filtration-separation from the reaction liquid, a dried form of the coloring matter of the formula (1) obtained by spray-drying of the reaction liquid and the like, or the like is used. The ink composition of the present invention contains typically 0.1 to 20% by mass, preferably 1 to 10% by mass and further preferably 2 to 8% by mass of the coloring matter of the above formula (1) relative to the whole volume of the ink composition.

The ink composition of the present invention is produced in that the coloring matter of the above formula (1) is dissolved in an aqueous medium such as water and/or a water-soluble organic solvent (water-miscible organic solvent), and if needed, an ink preparation agent is added. When this ink composition is used as an ink for an inkjet printer, it is preferable to be smaller content of inorganic substances contained as impurities, for example, metal cation chlorides such as sodium chloride, sulfate salts such as sodium sulfate, and the like. In this case, the total content of the sodium chloride and the sodium sulfate in the coloring matter is, for example, about 1% by mass or less relative to the whole volume of the coloring matter. In order to produce the coloring matter having a smaller content of inorganic substances, desalting treatment may be carried out, for example, by the method using a reverse osmosis membrane known per se, or by a method where a dried form or a wet cake of the water-soluble azo compound of the present invention or a salt thereof is stirred in a mixed solvent of alcohol such as methanol and water for purification by suspension, a solid is separated by filtration and dried, or otherwise.

The ink composition of the present invention is prepared with water as a medium, and according to necessity, may contain a water-soluble organic solvent, and in addition, ink preparation agents within the range where the effects of the present invention are not impaired. Typically, they are preferably contained. A water-soluble organic solvent is used as a drying preventive (wetting agent), a viscosity modifier, a penetration enhancer, a surface tension modifier, an antifoaming agent and the like. Examples of other ink preparation agents include, for example, known additives such as an antiseptic and fungicide, a pH adjuster, a chelating agent, a rust preventive agent, an ultraviolet absorbing agent, a viscosity modifier, a dye dissolving agent, an antifading agent, an emulsion stabilizer, a surface tension modifier, an antifoaming agent, a dispersing agent, a dispersion stabilizer and the like. The content of the water-soluble organic solvent is 0 to 60% by mass and preferably 10 to 50% by mass relative to the whole ink, and the other ink preparation agents are advisably used in an amount of 0 to 20% by mass and preferably 0 to 15% by mass relative to the whole ink. The rest, except for the above mentioned, is water.

Examples of the water-soluble organic solvent which can be used in the present invention include, for example, C1 to C4 alkanols such as methanol, ethanol, n-propanol, isopropanol, n-butanol, isobutanol, secondary butanol and tertiary butanol; amides such as N,N-dimethylformamide or N,N-dimethylacetoamide; heterocyclic ketones such as 2-pyrrolidone, N-methyl-2-pyrrolidone, 1,3-dimethylimidazolidin-2-one or 1,3-dimethylhexahydropyrimid-2-one; aliphatic ketones or aliphatic keto alcohols such as acetone, methyl ethyl ketone, and 2-methyl-2-hydroxypentan-4-one; cyclic ethers such as tetrahydrofuran and dioxane; mono-, oligo- or poly-alkylene glycols or thioglycols having a (C2 to C6)alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol or thiodiglycol; polyols (preferably triols) such as glycerine, hexane-1,2,6-triol; polyhydric alcohol (C1 to C4) monoalkyl ethers such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether and triethylene glycol monoethyl ether; γ-butyrolactone or dimethylsulfoxide, and the like.

Among the above water-soluble organic solvents, preferable are isopropanol, glycerine, mono-, di- or tri-ethylene glycol, dipropylene glycol, 2-pyrrolidone, N-methyl-2-pyrrolidone and butyl carbitol, and more preferable are isopropanol, glycerine, diethylene glycol, 2-pyrrolidone and N-methyl-2-pyrrolidone and butyl carbitol. These water-soluble organic solvents may be used alone or as a mixture thereof.

Examples of the antiseptic and fungicide include, for example, organic sulfur based, organic nitrogen sulfur based, organic halogen based, haloallylsulfone based, iodopropargyl based, N-haloalkylthio based, benzothiazole based, nitrile based, pyridine based, 8-oxyquinoline based, isothiazoline based, dithiol based, pyridineoxide based, nitropropane based, organic tin based, phenol based, quaternary ammonium salt based, triazine based, thiadiazine based, anilide based, adamantane based, dithiocarbamate based, brominated indanone based, benzyl bromoacetate based, and inorganic salt based compounds.

Examples of the organic halogen based compound include, for example, sodium pentachlorophenol, examples of the pyridineoxide based compound include, for example, 2-pyridinethiol-1-oxide sodium and examples of the isothiazoline based compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and in addition, sodium acetate and the like.

Examples of other antiseptic and fungicide include sodium sorbate, sodium benzoate and the like. Specific examples of the other antiseptic and fungicide preferably include, for example, Proxel® GXL (S) and Proxel® XL-2 (S) which are trade names and manufactured by Avecia, and the like.

As a pH adjuster, any substance may be used as long as it can control the pH of the ink in the range of 6.0 to 11.0 in order to improve the storage stability of the ink. Examples thereof include, for example, alkanolamines such as diethanolamine and triethanolamine, alkali metal hydroxides such as lithium hydroxide, sodium hydroxide and potassium hydroxide, ammonium hydroxide, alkali metal carbonates such as lithium carbonate, sodium carbonate and potassium carbonate, or the like.

Examples of the chelating agent include, for example, sodium ethylenediaminetetraacetate, sodium nitrilotriacetate, sodium hydroxyethylethylenediaminetriacetate, sodium diethylenetriaminepentaacetate, sodium uracil diacetate and the like.

Examples of the rust preventive agent include, for example, hydrogen sulfite salt, sodium thiosulfate, ammonium thioglycolate, diisopropylammonium nitrite, pentaerythritol tetranitrate, dicyclohexylammonium nitrite and the like.

Examples of the ultraviolet absorbing agent include, for example, benzophenone based compounds, benzotriazole based compounds, cinnamic acid based compounds, triazine based compounds, stilbene based compounds, and compounds as typified by a benzoxazole based compound which absorbs ultraviolet rays and emits fluorescence, so-called fluorescent brightening agent, may be also used.

Examples of the viscosity modifier include water-soluble polymer compounds other than water-soluble organic solvents, for example, polyvinyl alcohol, cellulose derivatives, polyamines, polyimines and the like.

Examples of the dye dissolving agent include, for example, urea, ε-caprolactam, ethylene carbonates and the like. Urea is preferably used.

An antifading agent is used for the intended purpose of improvement of storage stability of images. As an antifading agent, various organic based and metal complex based antifading agents may be used. Examples of the organic antifading agent include hydroquinones, alkoxyphenols, dialkoxyphenols, phenols, anilines, amines, indanes, chromans, alkoxyanilines, heterocycles and the like, and examples of the metal complex antifading agents include nickel complexes, zinc complexes and the like.

Examples of the surface tension modifier include surfactants, for example, anionic surfactants, amphoteric surfactants, cationic surfactants, nonionic surfactants and the like.

Examples of the anionic surfactants include alkylsulfocarboxylates, α-olefin sulfonates, polyoxyethylene alkyl ether acetates, N-acyl amino acids and salts thereof, N-acylmethyltaurine salts, alkylsulfate polyoxyalkylether sulfates, alkylsulfate polyoxyethylene alkylether phosphates, rosin acid soaps, castor oil sulfates, lauryl alcohol sulfates, alkylphenol type phosphate esters, alkyl type phosphate esters, alkyl allylsulfonates, diethylsulfosuccinates, diethylhexylsulfosuccinates, dioctylsulfosuccinates and the like.

Examples of the cationic surfactant include 2-vinylpyridine derivatives, poly(4-vinylpyridine) derivatives and the like.

Examples of the amphoteric surfactant include lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and in addition, imidazoline derivatives and the like.

Examples of the nonionic surfactant include ether type, for example, polyoxyethylene alkylphenyl ethers such as polyoxyethylene nonylphenyl ether, polyoxyethylene octylphenyl ether, polyoxyethylene dodecylphenyl ether or polyoxyethylene octylphenyl ether and polyoxyethylene alkyl ethers such as polyoxyethylene oleyl ether or polyoxyethylene lauryl ether; ester type such as polyoxyethylene oleic acid, polyoxyethylene oleate ester, polyoxyethylene distearic acid ester, sorbitan laurate, sorbitan monostearate, sorbitan monooleate, sorbitan sesquioleate, polyoxyethylene monooleate, polyoxyethylene stearate; acetylene glycol(alcohol) type such as 2,4,7,9-tetramethyl-5-decyne-4,7-diol, 3,6-dimethyl-4-octyne-3,6-diol, 3,5-dimethyl-1-hexyne-3-ol (for example, Surfynol® 104, 82 and 465 and Olfine® STG which are trade names and manufactured by Nissin Chemical Industry Co., Ltd., and the like); and the like.

As the antifoaming agent, highly oxidized oil based, glycerin fatty acid ester based, fluorine based and silicone based compounds are used according to necessity.

These ink preparation agents are used alone or as a mixture thereof. Meanwhile the surface tension of the ink of the present invention is typically 25 to 70 mN/m and more preferably 25 to 60 mN/m. In addition, the viscosity of the ink of the present invention is preferably 30 mPa·s or less. Further, it is preferably adjusted to 20 mPa·s or less.

In production of the ink composition of the present invention, the sequence order of dissolving the agents such as additives is not particularly limited. In preparation of the ink, as water to be used, water with less impurity, such as ion-exchanged water or distilled water, is preferable. In addition, microfiltration may be carried out using a membrane filter to remove off foreign substances according to necessity, and it is preferably carried out when the ink is used as an ink for inkjet printer. The pore size of the filter with which microfiltration is carried out is typically 1 micron to 0.1 micron and preferably 0.8 microns to 0.2 microns.

Ink compositions containing the coloring matter of the present invention is suitably used in impress printing, copying, marking, writing, drafting, stamping, or recording (printing), particularly for inkjet recording. In addition, ink composition of the present invention hardly causes crystal precipitation in spite of dryness in the vicinity of the nozzle of an inkjet printer, and for this reason, clogging hardly occurs at the head, either. Further, when the ink composition of the present invention is used for inkjet recording, high quality yellow printed matters which has good fastnesses against water, light, ozone or nitrogen oxide gas, friction, and which has particularly a high color density can be obtained.

There are some inkjet printers respectively employing two kinds of inks, an ink having a high concentration and an ink having a low concentration, for the intended purpose of supplying high resolution images. In that case, using the coloring matter of the present invention, an ink composition having a high concentration and an ink composition having a low concentration may prepared respectively, which may be used as an ink set. In addition, only either thereof may use said coloring matter. Further, the coloring matter of the present invention and a known yellow coloring matter may be used in combination. Furthermore, in order to prepare a red ink or a green ink, the coloring matter of the present invention may be mixed with another color (for example, a magenta coloring matter or a cyan coloring matter) for use. Moreover, the coloring matter of the present invention may be used as a coloring matter for toning of black ink.

The colored product of the present invention is a product (colored article) colored with the coloring matter of the present invention or an ink composition or the like containing the coloring matter of the present invention. The quality of material for the colored product is not limited. For the material for the colored product, for example, any of communication sheets such as paper and film, fiber and cloth (cellulose, nylon, wool and the like), leather, substrates for color filters, and the like may be used as long as it can be colored, and it is not limited thereto. Examples of a coloring method include, for example, printing methods such as dip dyeing, textile printing, screen printing, a method by an inkjet printer, and the like, preferably a method by an inkjet printer.

The communication sheet which undergone surface treatment is preferable, and specifically the communication sheet provided with an ink receiving layer on the substrate thereof such as paper, synthetic paper, film and the like is preferable. The ink receiving layer is provided by, for example, a method of impregnation or coating a cation polymer on the above substrate; a method of coating, on the above substrate surface, inorganic particulates which can absorb the coloring matter in the ink, such as porous silica, aluminasol or special ceramics, together with a hydrophilic property polymer such as polyvinyl alcohol or polyvinylpyrrolidone; and the like.

Sheet provided with such an ink receiving layer is typically called inkjet special paper, inkjet special film, glossy paper, glossy film or the like.

Among them, inkjet special paper coated with the above porous silica, aluminasol, special ceramics or the like on the substrate surface thereof is regarded to be susceptible to gases having oxidizing effect in the air, i.e., ozone gas, nitrogen oxide gas or the like.

Some examples of, for example, typical commercial products as the inkjet special paper are as follows; trade name: Pictorico® (manufactured by Asahi Glass Co., Ltd.); trade name: Professional Photopaper, Super Photopaper and Matte Photopaper (all manufactured by Canon Inc.); trade name: Photo Paper CRISPIA® (highly glossy), Photo Paper (glossy) and Photo Matte Paper (all manufactured by Seiko-Epson Corporation); trade name: Advanced Photo Paper (glossy), Premium Glossy Film and Photo Paper (all manufactured by Hewlett Packard Japan, Ltd.); trade name: PhotoLikeQP (manufactured by KONICA Corporation); trade name: High Quality Paper and Glossy Photo Paper (all manufactured by Sony Corporation); and the like.

The ink composition of the present invention has an excellent fastness against the above gases having oxidizing effect, whereby excellent recorded images having less discoloration or fading can be provided even in recording onto such a record-receiving material. In addition, it may be positively used for plain paper.

In order to record on a record-receiving material by the inkjet recording method of the present invention, for example, a container filled with the above ink composition may be set in a predetermined position in an inkjet printer and recording may be carried out on a record-receiving material by a typical method. In the inkjet recording method of the present invention, an magenta ink, a cyan ink, and according to necessity, a green ink, a blue (or violet) ink, a red ink, a black ink and the like may be used together with the ink composition of the present invention. In this case, each color ink is filled into each container, which is installed in a predetermined position in an inkjet printer for use.

Examples of the inkjet printer include, for example, a piezo inkjet printer using mechanical vibration and a printer using the bubble jet (which is a registered trademark) system where foam generated by heating is used, or the like. In the inkjet recording method of the present invention, any method can be used.

The ink composition of the present invention exhibits vivid yellow, particularly allows images recorded on an inkjet special paper or glossy paper to be high in color definition and color density (particularly high in color density), and has a hue suitable for the inkjet recording method. In addition, it is characterized in that the fastnesses of the recorded image are very high.

The ink composition of the present invention is free from precipitation or separation during storage. In addition, when the ink composition of the present invention is used in inkjet recording, crystal precipitation by transpiration of water (high concentrating) in the ink composition hardly occurs in the vicinity of a nozzle and no clogging occurs at the injector (inkhead). The ink composition of the present invention is free from change in physical properties when used in ink recirculation at intervals of relatively long hours by using a continuous inkjet printer or in intermittent by an on-demand inkjet printer.

EXAMPLES

Hereinafter, the present invention will be more specifically explained with reference to Examples. In this connection, unless otherwise specified, "part(s)" and "%" in the description are based on mass and "reaction temperature" means internal temperature.

In addition, λmax (maximum absorption wavelength) of each synthesized compound is shown by a value measured in an aqueous solution with pH 7 to 8. Further, any of the coloring matters of the present invention obtained in Examples is a sodium salt, however, the chemical structural formulas thereof are shown in free acid for convenience. However, as described above, alkali metal salts thereof other than a free acid or a sodium salt can be also obtained easily by using an appropriate method, and the present invention is not limited to the present examples.

Example 1

In 200 parts of water, 17.3 parts of 3-aminobenzenesulfonic acid was dissolved while adjusting to pH 6 with a sodium hydroxide, and then 7.2 parts of sodium nitrite was added thereto. This solution was added dropwise to 300 parts of 5% hydrochloric acid at 0 to 10° C. over 30 minutes and then stirred at 10° C. or lower for 1 hour, and diazotization reaction was carried out to prepare a diazonium salt.

Meanwhile, in 130 parts of water, 12.3 parts of 2-methoxyaniline was dissolved while adjusting to pH 5 with a sodium hydroxide. The resulting solution was treated in the conventional manner using 10.4 parts of sodium bisulfite and 8.6 parts of 35% formalin to obtain a methyl-ω-sulfonic acid derivative.

The obtained methyl-ω-sulfonic acid derivative was added to the diazonium salt previously prepared and stirring was carried out at 0 to 15° C. and pH 2 to 4 for 5 hours. The resulting reaction liquid was adjusted to pH 11 with a sodium hydroxide, and then stirred at 80 to 95° C. for 5 hours while maintaining the same pH. Subsequently 100 parts of sodium chloride was added thereto for salting out to precipitate a solid, which was then separated by filtration to obtain 100 parts of an azo compound represented by the following formula (5) as a wet cake.

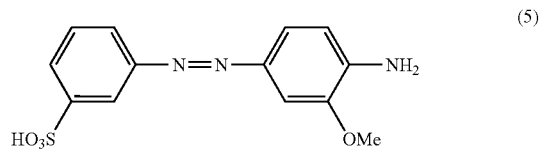

(5)

In 200 parts of water, 17.3 parts of 3-aminobenzenesulfonic acid was dissolved while adjusting to pH 6 with a sodium hydroxide, and then 7.2 parts of sodium nitrite was added thereto. This solution was added dropwise to 300 parts of 5% hydrochloric acid at 0 to 10° C. over 30 minutes and then stirred at 10° C. or below for 1 hour, and diazotization reaction was carried out to prepare a diazonium salt.

Meanwhile, in 130 parts of water, 23.1 parts of 2-sulfopropoxyaniline was dissolved while adjusting to pH 5 with a sodium hydroxide. The resulting solution was treated in the conventional manner using 10.4 parts of sodium bisulfite and 8.6 parts of 35% formalin to obtain a methyl-ω-sulfonic acid derivative.

The obtained methyl-ω-sulfonic acid derivative was added to the diazonium salt previously prepared and stirring was carried out at 0 to 15° C. and pH 2 to 4 for 5 hours. The reaction liquid was adjusted to pH 11 with a sodium hydroxide and then stirred at 80 to 95° C. for 5 hours while maintaining the same pH, and 100 parts of sodium chloride was added thereto for salting out to precipitate a solid, which was then separated by filtration to obtain 130 parts of an azo compound represented by the following formula (6) as a wet cake.

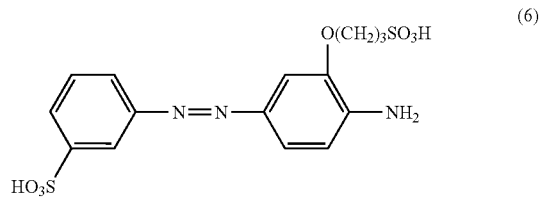

(6)

Next, to 250 parts of ice water, 0.10 parts of LEOCOL® TD90 (which is a trade name of a surfactant manufacture by Lion Corporation) was added and violently stirred, and 8.0 parts of cyanuric chloride was added thereto and stirring was carried out at 0 to 5° C. for 30 minutes to obtain a suspension.

In 200 parts of water, 100 parts of the azo compound (5) as a wet cake obtained in the above manner was dissolved, and the above suspension was added dropwise to this solution over 30 minutes. After completion of the dropwise addition, said solution was stirred at pH 5 to 6 and 0 to 10° C. for 6 hours.

Next, in 300 parts of water, 130 parts of the azo compound (6) as a wet cake obtained in the above manner was dissolved and added dropwise to the above solution over 30 minutes. After completion of the dropwise addition, the solution was stirred at pH 6 to 7 and 25 to 35° C. for 6 hours, and 18.8 parts of taurine was added thereto and stirring was carried out at pH 7 to 9 and 75 to 80° C. for 3 hours. The resulting reaction liquid was cooled to 20 to 25° C., and then 800 parts of acetone was added to this reaction liquid and stirring was carried out at 20 to 25° C. for 1 hour to precipitate a solid, which was then separated by filtration to obtain 95.0 parts of a wet cake. This wet cake was dried with a hot air dryer at 80° C. to obtain 30.0 parts of a water-soluble azo compound of the present invention represented by the following formula (7); (λmax: 391 nm).

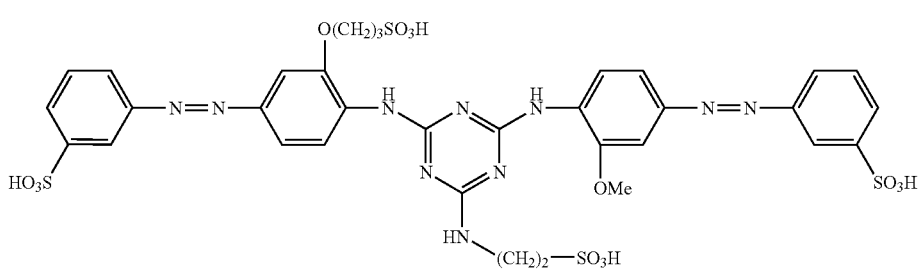

(7)

Example 1A

(A) Preparation of Ink

Using the azo compound of the present invention obtained in the above Example 1, the following components were mixed in the composition ratio shown in Table 2 to obtain an ink composition of the present invention, which was then filtered with a 0.45 μm membrane filter respectively to remove off foreign substances. In this connection, ion-exchanged water was used as water, the ink composition was adjusted with an aqueous sodium hydroxide solution such that the pH thereof was about 9, and then water was added so that the total amount thereof was 100 parts.

TABLE 2A

| (Composition ratio of ink composition) | |
|---|---|
| The azo compound obtained in Example 1 | 3.5 parts |
| Glycerine | 5.0 parts |
| Urea | 5.0 parts |
| N-methyl-2-pyrrolidone | 4.0 parts |
| Isopropylalcohol | 3.0 parts |
| Butyl carbitol | 2.0 parts |
| Surfynol 104PG50 (trade name) (noted below) | 0.1 part |
| Sodium hydroxide + water | 77.4 parts |
| Total | 100.0 parts |

Note:
Acetylene glycol nonionic surfactant, manufactured by Nissin Chemical Industry Co., Ltd.

Comparative Example 1A

As Comparative Example 1A, using C.I. Direct Yellow 132 widely used as a yellow coloring matter for inkjet instead of the azo compound obtained in Example 1 as a coloring matter component, an ink composition for comparison was prepared in the same composition ratio as in Table 2A.

Comparative Example 2A

As Comparative Example 2A, using the compound of the following formula (13) synthesized in the method described in Example 1 of Patent Literature 4 instead of the azo compound obtained in Example 1 as a coloring matter component, an ink composition for comparison was prepared in the same composition ratio as in Table 2A. The structural formula of the compound used is shown below. In addition, evaluation was carried out using a sodium salt of the following formula (13).

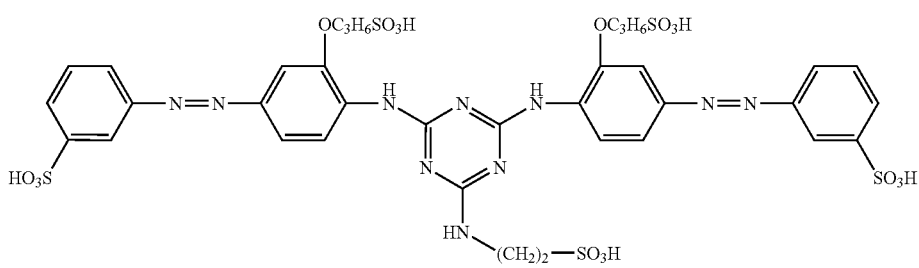

(13)

(B) Inkjet Printing

Using an inkjet printer (manufactured by Canon Inc.; trade name: PIXUS ip7100), inkjet recording was carried out on a glossy paper (manufactured by Canon Inc.; trade name: Professional Photopaper PR-101). In inkjet recording, an image pattern was made so that several gradations in reflection density were obtained, and yellow printing matters were obtained.

Moisture fastness test was carried out using a printed matter having an unprinted part and a printed part. In addition, for light fastness test, nitrogen oxide gas fastness test and ozone gas fastness test, measurement of reflection density was carried out in the part where D value as a reflection density of the printing matter before the test was nearest to 1. Further, reflection density was measured using a colorimetric system (SpectroEye, manufactured by GretagMacbeth).

The test methods for recorded images and the evaluation method for the test results will be described below.

(C) Color Density of Printed Matter

Using the above colorimetric system, Dy value as a yellow density was measured on the part of the images printed on glossy paper where the reflection density was highest. The results are shown in Table 3A. The evaluation criteria are as follows.

| Dy value is 1.70 or more | ○ |
| Dy value is under 1.70 and 1.60 or more | Δ |
| Dy value is under 1.60 | X |

(D) Moisture Fastness Test

Test pieces Printed on glossy paper were left at 50° C. and 90% RH for 7 days using a thermo-hygrostat (manufactured by Ohken. Co., Ltd,) and bleeding of coloring matter (dye) from the printed part to the unprinted part was judged by visual observation before and after the test. The results are shown in Table 3A. The evaluation criteria are as follows.

| Bleeding of coloring matter to the unprinted part is hardly observed | ○ |
| Bleeding of coloring matter to the unprinted part is slightly observed | Δ |
| Bleeding of coloring matter to the unprinted part is considerably observed | X |

(E) Xenon Light Fastness Test

Using a xenon weatherometer Ci4000 (manufactured by ATLAS), test pieces printed on glossy paper were placed in the holder and irradiated at an irradiance of 0.36 W/m² for 100 hours.

After the test, each reflection density was measured using a colorimetric system, each residual rate of coloring matter was calculated from (reflection density after the test/reflection density before the test)×100(%), and using the same colorimetric system, each color difference ΔE before and after the test was measured.

The results are shown in Table 4A.

(F) Nitrogen Oxide Gas Fastness Test

In the chamber of a nitrogen oxide gas staining fastness tester GF-5 (manufactured by Suga Test Instruments Co., Ltd.), a petri dish where 15 ml of a saturated aqueous solution of sodium nitrite and 10 ml of an aqueous 5% sulfuric acid solution were added was set, and nitrogen oxide gas was generated, and test pieces printed on glossy paper 1 and glossy paper 2 were set in the same chamber and exposed for 30 minutes. After the exposure, the glossy papers were left for 1 week at room temperature and excessively absorbed nitrogen oxide gas was purged, and then each reflection density was measured using the above colorimetric system. After the measurement, each residual rate of coloring matter was calculated from (reflection density after the test/reflection density before the test)×100(%) and evaluated into 3 levels.

| Residual rate of coloring matter is 80% or more | ○ |
| Residual rate of coloring matter is 70% or more and below 80% | Δ |
| Residual rate of coloring matter is below 70% | X |

The results are shown in Table 3A.

(G) Ozone Gas Fastness Test

Test pieces Printed on glossy paper 1 and glossy paper 2 were left in a circumstance of an ozone concentration of 10 ppm, a humidity of 60% RH and a temperature of 24° C. for 8 hours using an ozone weatherometer (manufactured by Suga Test Instruments Co., Ltd.) and then each reflection density was measured using the above colorimetric system. After the measurement, each residual rate of coloring matter was calculated from (reflection density after the test/reflection density before the test)×100(%) and evaluated into 3 levels.

| Residual rate of coloring matter is 85% or more | ○ |
| Residual rate of coloring matter is 80% or more and below 85% | Δ |
| Residual rate of coloring matter is under 80% | X |

The results are shown in Table 3A.

(H) Solubility Test

For the azo compound obtained in Example 1A and the compounds used in Comparative Example 1A and Comparative Example 2A, solubility in water was tested. Ion-exchanged water was used as water, and the test was carried out at around pH 8 and at room temperature (about 25° C.). Evaluation of solubility was carried out according to the following evaluation criteria.

| Water solubility is 100 g/L or more | ○ |
| Water solubility is 50 g/L or more and below100 g/L | Δ |
| Water solubility is below 50 g/L | X |

The results are shown in Table 5A.

TABLE 3A

The test results of color density (C), moisture fastness (D), nitrogen oxide gas fastness (F) and ozone gas fastness (G)

|  | (C) | (D) | (F) | (G) |
|---|---|---|---|---|
| Example 1A | ○ | ○ | ○ | ○ |
| Comparative Example 1A | ○ | Δ | ○ | Δ |
| Comparative Example 2A | X | ○ | ○ | ○ |

TABLE 4A

The test results (actual values) of color density of printed matter (C)

|  | Dy value |
| --- | --- |
| Example 1A | 1.72 |
| Comparative Example 1A | 1.77 |
| Comparative Example 2A | 1.58 |

TABLE 5A

The test results of xenon light fastness (E)

|  | Residual rate (%) of coloring matter | ΔE |
| --- | --- | --- |
| Example 1A | 89.0 | 4.6 |
| Comparative Example 1A | 73.8 | 16.2 |
| Comparative Example 2A | 88.6 | 5.0 |

TABLE 6A

The results of solubility test (H)

|  | Solubility |
| --- | --- |
| Example 1A | ○ |
| Comparative Example 1A | Δ |
| Comparative Example 2A | ○ |

As is clear from the results of Table 3A, bleeding is slightly observed in (D) moisture fastness test and the residual rate of coloring matter is 80% or more and less than 85% in (G) ozone fastness test for the ink of Comparative Example 1A using C.I. Direct Yellow 132, while bleeding is hardly observed in the former test and the residual rate is 85% or more in the latter test for the ink of Example 1A, whereby it is found that the ink of Comparative Example 1A has a problem in these fastnesses. In addition, as for (C) color density, the ink of Comparative Example 2A has a Dy value of less than 1.60, while the ink of Example 1A has a Dy value of 1.70 or more, whereby it is confirmed that the ink of Comparative Example 2A has a problem in color density. Actual values thereof for color density were denoted in Table 4A. The Dy value of the ink of Example 1A is 9% larger than that of Comparative Example 2, whereby it is found that the color density of the ink of Example 1A is high.

From Table 5A, in (E) light fastness test, the ink of Example 1A has a residual rate of coloring matter of 89.0% and a color difference of 4.6, it being found that the ink of Example 1A has a clearly excellent light fastness, compared with the ink of Comparative Example 1A having a residual rate of coloring matter of 73.8% and a color difference of 16.2.

In addition, as is clear from Table 6A, in (H) solubility test, C.I. Direct Yellow 132 used in Comparative Example 1A has a solubility in water of 50 g/L or more and below 100 g/L, while the coloring matter compound used in the ink of Example 1A has a solubility in water of 100 g/L or more showing a water-solubility higher than Comparative Example 1A.

Judging from the above results, the ink of Example 1A has the same excellent fastnesses as that of Comparative Example 2A and a more excellent color density than that of Comparative Example 2A, and shows more excellent results in the tests of moisture fastness, light fastness, ozone fastness and solubility than the ink of Comparative Example 1A.

Example 2

In the same manner as in Example 1 except that 17.3 parts of 4-aminobenzenesulfonic acid was used instead of 17.3 parts of 3-aminobenzenesulfonic acid in Example 1, 30.0 parts of water-soluble azo compound of the present invention represented by the following formula (8) was obtained; (λmax: 391 nm).

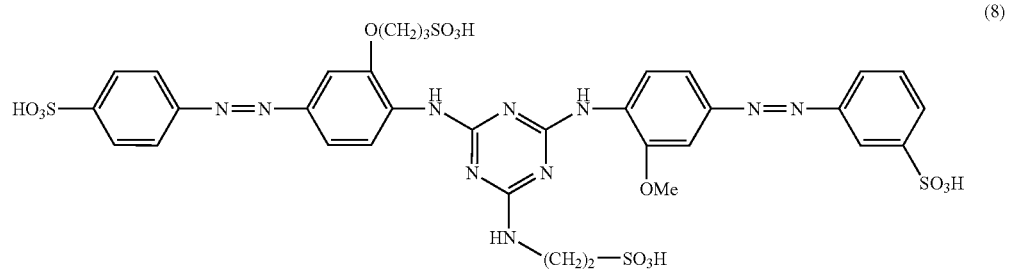

(8)

Example 3

In the same manner as in Example 1 except that 30.3 parts of 2-aminonaphthalene-4,8-disulfonic acid was used instead of 17.3 parts of 3-aminobenzenesulfonic acid in Example 1 and 10.7 parts of 3-methylaniline was used instead of 12.3 parts of 2-methoxyaniline in Example 1, 31.0 parts of a water-soluble azo compound of the present invention represented by the following formula (9) was obtained; (λmax: 390 nm).

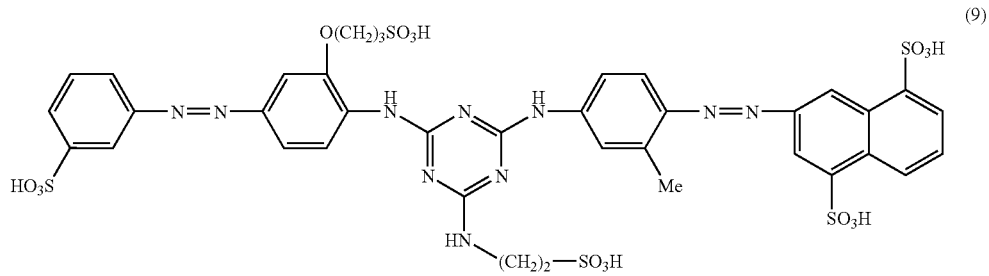

(9)

Example 4

In the same manner as in Example 1 except that 30.3 parts of 2-aminonaphthalene-6,8-disulfonic acid was used instead of 17.3 parts of 3-aminobenzenesulfonic acid in Example 1 and 9.3 parts of aniline was used instead of 12.3 parts of 2-methoxyaniline in Example 1, 30.5 parts of a water-soluble azo compound of the present invention represented by the following formula (10) was obtained; (λmax: 389 nm).

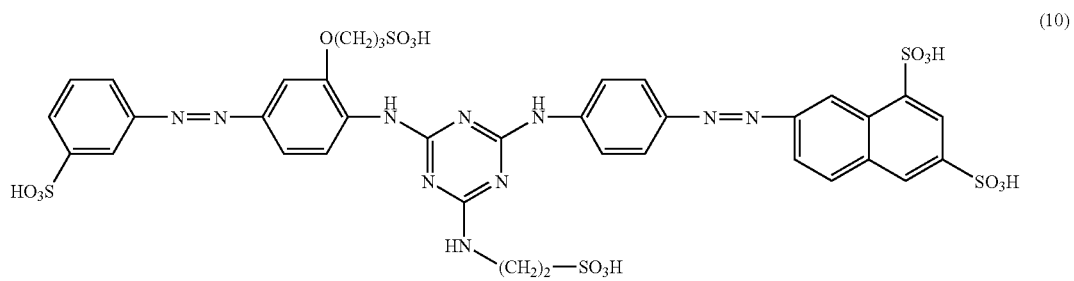

(10)

Example 5

In 250 parts of ice water, 0.10 parts of LEOCOL TD90 (which is a trade name of a surfactant manufactured by Lion Corporation) was added and violently stirred, and 8.0 parts of cyanuric chloride was added thereto and stirring was carried out at 0 to 5° C. for 30 minutes to obtain a suspension.

An azo compound (manufactured by Chemco International) represented by the following formula (11) was dissolved in 200 parts of water, and the above suspension was added dropwise to this solution over 30 minutes. After completion of the dropwise addition, the resulting was stirred at pH 5 to 6 and 0 to 10° C. for 8 hours to obtain a solution.

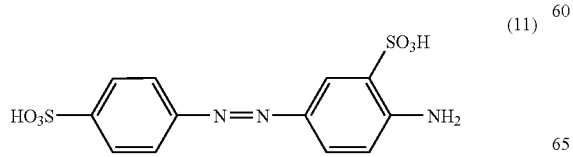

(11)

Next, 130 parts of an azo compound as a wet cake represented by the above formula (6) obtained in the same manner as in Example 1 was dissolved in 300 parts of water, and added dropwise to the above solution over 30 minutes. After completion of the dropwise addition, the resulting was stirred at pH 6 to 7 and 25 to 35° C. for 6 hours, and 18.8 parts of taurine was added thereto and stirring was carried out at pH 7 to 9 and 75 to 80° C. for 3 hours. The resulting reaction liquid was cooled to 20 to 25° C., and 800 parts of acetone was added to this reaction liquid and stirring was carried out at 20 to 25° C. for 1 hour to precipitate a solid, which was then separated by filtration to obtain 95.0 parts of a wet cake. This wet cake was dried with a hot air dryer at 80° C. to obtain 31.0 parts of a water-soluble azo compound of the present invention represented by the following formula (12); (λmax: 379 nm).

TABLE 2-continued

| (Composition ratio of ink composition) | |
|---|---|
| Isopropylalcohol | 3.0 parts |
| Butyl carbitol | 2.0 parts |
| Surfynol 104PG50 (trade name) (noted below) | 0.1 part |
| Sodium hydroxide + water | 77.4 parts |
| Total | 100.0 parts |

Note:
Acetylene glycol nonionic surfactant, manufactured by Nissin Chemical Industry Co., Ltd.

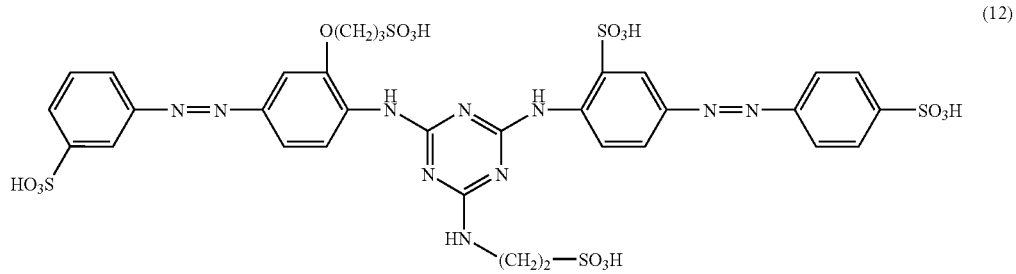

(12)

Examples 6 to 9

(A) Preparation of Ink

Using the azo compounds of the present invention obtained in the above Examples 2 to 5, the following components were mixed in the composition ratio shown in Table 2 to obtain ink compositions of the present invention, which were then respectively filtered with a 0.45 μm membrane filter to remove off foreign substances. In this connection, ion-exchanged water was used as water, each ink composition was adjusted with an aqueous sodium hydroxide solution such that the pH thereof was about 9, and then water was added so that the total amount thereof was 100 parts. The ink composition prepared using the compound of Example 2 is for Example 6, the ink composition prepared using the compound of Example 3 is for Example 7, the ink composition prepared using the compound of Example 4 is for Example 8, and the ink composition prepared using the compound of Example 5 is for Example 9.

TABLE 2

| (Composition ratio of ink composition) | |
|---|---|
| The azo compound obtained in each Example described above | 3.5 parts |
| Glycerine | 5.0 parts |
| Urea | 5.0 parts |
| N-methyl-2-pyrrolidone | 4.0 parts |

Comparative Example 1

As Comparative Example 1, using C.I. Direct Yellow 132 widely used as a yellow coloring matter for inkjet instead of the azo compound obtained in each Example described above as a coloring matter component, an ink composition for comparison was prepared in the same composition ratio as in Table 2.

Comparative Example 2

As Comparative Example 2, using the compound of the following formula (13) synthesized in the method described in Example 1 of Patent Literature 4 instead of the azo compound obtained in each Example described above as a coloring matter component, an ink composition for comparison was prepared in the same composition ratio as in Table 2. In this connection, as the compound of the following formula (13), the sodium salt thereof was used.

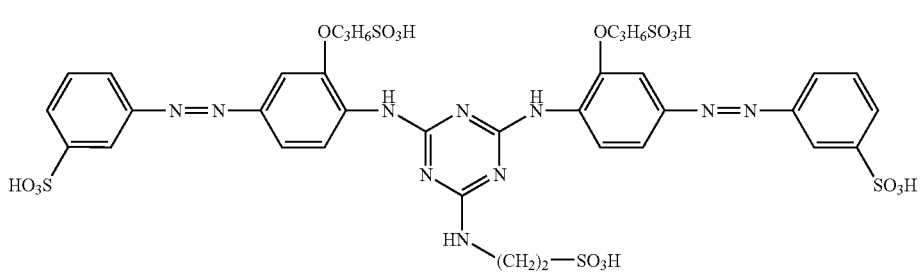

(13)

Comparative Example 3

As Comparative Example 3, using the compound of the following formula (14) synthesized in the method described in Example 1 of Patent Literature 5 instead of the azo compound obtained in each Example described above as a coloring matter component, an ink composition for comparison was prepared in the same composition ratio as in Table 2. In this connection, as the compound of the following formula (14), the sodium salt thereof was used.

| | |
|---|---|
| Dy value is 1.70 or more | ○ |
| Dy value is under 1.70 and 1.60 or more | Δ |
| Dy value is under 1.60 | X |

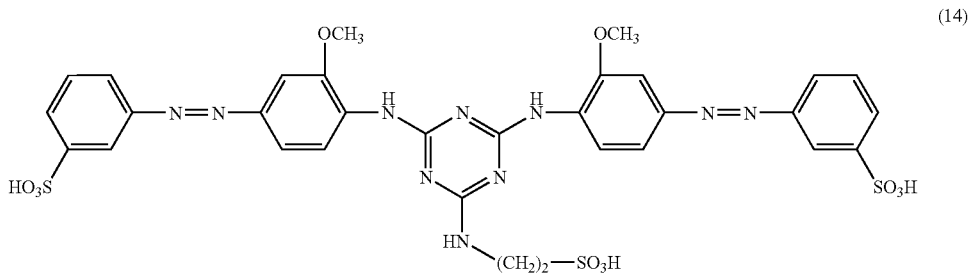

(14)

(B) Inkjet Printing

Using an inkjet printer (manufactured by Canon Inc.; trade name: PIXUS ip7100), inkjet recording was carried out on a glossy paper (manufactured by Canon Inc.; trade name: Professional Photopaper PR-101). In inkjet recording, an image pattern was made so that several gradations in reflection density were obtained, and yellow printing matters were obtained.

Moisture fastness test was carried out using a printed matter having an unprinted part and a printing part. In addition, for light fastness test, nitrogen oxide gas fastness test and ozone gas fastness test, measurement was carried out on reflection density in the part where D value as a reflection density of the printing matters before the test was nearest to 1. Further, reflection density was measured using a colorimetric system (SpectroEye, manufactured by GretagMacbeth).

The test methods for recorded images and the evaluation method for the test results will be described below.

(C) Color Density of Printed Matter

Using the above colorimetric system, Dy value as a yellow density was measured on the part of the images printed on glossy paper where the reflection density was highest. The results are shown in Tables 3 and 4. The evaluation criteria are as follows.

(D) Moisture Fastness Test

Test pieces printed on glossy paper were left at 50° C. and 90% RH for 7 days using a thermo-hygrostat (manufactured by Ohken. Co., Ltd,) and bleeding of coloring matter (dye) from the printed part to the unprinted part was judged by visual observation before and after the test. The results are shown in Table 3. The evaluation criteria are as follows.

| | |
|---|---|
| Bleeding of coloring matter to the unprinted part is hardly observed | ○ |
| Bleeding of coloring matter to the unprinted part is slightly observed | Δ |
| Bleeding of coloring matter to the unprinted part is considerably observed | X |

(E) Xenon Light Fastness Test

Using a xenon weatherometer Ci4000 (manufactured by ATLAS), test pieces printed on glossy paper were placed in the holder and irradiated at an irradiance of 0.36 W/m² for 100 hours.

After the test, each reflection density was measured using a colorimetric system, each residual rate of coloring matter was calculated from (reflection density after the test/reflection density before the test)×100(%), and using the same colorimetric system, each color difference ΔE before and after the test was measured.

The results are shown in Table 5.

(F) Nitrogen Oxide Gas Fastness Test

In the chamber of a nitrogen oxide gas staining fastness tester GF-5 (manufactured by Suga Test Instruments Co., Ltd.), a petri dish where 15 ml of a saturated aqueous solution of sodium nitrite and 10 ml of an aqueous 5% sulfuric acid solution were added was set, nitrogen oxide gas was generated, and test pieces printed on glossy paper 1 and glossy paper 2 were set in the same chamber and exposed for 30 minutes. After the exposure, the glossy papers were left for 1 week at room temperature and excessively absorbed nitrogen oxide gas was purged, and then each reflection density was measured using the above colorimetric system. After the measurement, each residual rate of coloring matter was calculated from (reflection density after the test/reflection density before the test)×100(%) and evaluated into 3 levels.

| | |
|---|---|
| Residual rate of coloring matter is 80% or more | ○ |
| Residual rate of coloring matter is 70% or more and below 80% | Δ |
| Residual rate of coloring matter is below 70% | X |

The results are shown in Table 3.

(G) Ozone Gas Fastness Test

Test pieces printed on glossy paper 1 and glossy paper 2 were left in a circumstance of an ozone concentration of 10 ppm, a humidity of 60% RH and a temperature of 24° C. for 8 hours using an ozone weatherometer (manufactured by Suga Test Instruments Co., Ltd.) and then each reflection density was measured using the above colorimetric system. After the measurement, each residual rate of coloring matter was calculated from (reflection density after the test/reflection density before the test)×100(%) and evaluated into 3 levels.

| | |
|---|---|
| Residual rate of coloring matter is 85% or more | ○ |
| Residual rate of coloring matter is 80% or more and below 85% | Δ |
| Residual rate of coloring matter is below 80% | X |

The results are shown in Table 3.

(H) Solubility Test

For the azo compounds obtained in Examples 2 to 5 and the compounds used in Comparative Example 2 and Comparative Example 3, solubility in water was tested. Ion-exchanged water was used as water and the test was carried out at around pH 8 and at room temperature (about 25° C.). Evaluation of solubility was carried out according to the following evaluation criteria.

| | |
|---|---|
| Water solubility is 100 g/L or more | ○ |
| Water solubility is 50 g/L or more and below 100 g/L | Δ |
| Water solubility is under 50 g/L | X |

The results are shown in Table 6.

TABLE 3

The test results of color density (C), moisture fastness (D), nitrogen oxide gas fastness (F) and ozone gas fastness (G)

| | (C) | (D) | (F) | (G) |
|---|---|---|---|---|
| Example 6 | ○ | ○ | ○ | ○ |
| Example 7 | ○ | ○ | ○ | ○ |
| Example 8 | ○ | ○ | ○ | ○ |
| Example 9 | ○ | ○ | ○ | ○ |
| Comparative Example 1 | ○ | Δ | ○ | Δ |
| Comparative Example 2 | X | ○ | ○ | ○ |
| Comparative Example 3 | ○ | ○ | ○ | Δ |

TABLE 4

The test results (actual values) of color density of printed matter (C)

| | Dy value |
|---|---|
| Example 6 | 1.72 |
| Example 7 | 1.75 |
| Example 8 | 1.75 |
| Example 9 | 1.78 |
| Comparative Example 1 | 1.81 |
| Comparative Example 2 | 1.58 |
| Comparative Example 3 | 1.75 |

TABLE 5

The test results of xenon light fastness (E)

| | Residual rate (%) of coloring matter | ΔE |
|---|---|---|
| Example 6 | 89.4 | 4.6 |
| Example 7 | 90.9 | 5.1 |
| Example 8 | 91.2 | 5.7 |
| Example 9 | 91.2 | 6.2 |
| Comparative Example 1 | 74.5 | 16.7 |
| Comparative Example 2 | 90.8 | 6.2 |
| Comparative Example 3 | 83.6 | 9.5 |

TABLE 6

The results of solubility test (H)

| | Solubility |
|---|---|
| Example 6 | ○ |
| Example 7 | ○ |
| Example 8 | ○ |
| Example 9 | ○ |
| Comparative Example 1 | Δ |
| Comparative Example 2 | ○ |
| Comparative Example 3 | ○ |

As is clear from the results of Table 3, bleeding is slightly observed in (D) moisture fastness test and the residual rate of coloring matter is 80% or more and below 85% in (G) ozone fastness test for the ink of Comparative Example 1 using C.I. Direct Yellow 132, whereby it is found that the ink of Comparative Example 1 has a problem in these fastnesses. The ink of Comparative Example 2 using the compound of the formula (13) has no problem in fastnesses, but the color density thereof in (C) test is under 1.60, whereby it is understood that the ink of Comparative Example 2 has a problem. Actual values thereof for this color density are denoted in Table 4. It is found that any ink of Examples has a high color density because each Dy value thereof is higher than that of Comparative Example 2 by 8% or more. The ink of Comparative Example 3 using the compound of the formula (14) can obtain good results in the tests of (C) color density, (D) moisture fastness and (F) nitrogen oxide gas fastness, but the residual rate of coloring matter thereof is 80% or more and below 85% as the result in (G) ozone gas fastness test, while the inks of all Examples have a residual rate of 85% or more, whereby it is found that the ink of Comparative Example 3 cannot be said to have enough fastness.

From Table 5, in (E) light fastness test, the ink of Example 6 has the lowest residual rate of coloring matter of 89.4% and the ink of Example 9 has the highest color difference of 6.2 among Examples, it being founded that the inks of Examples have a clearly excellent light fastness, compared with the ink of Comparative Example 1 having a residual rate of coloring matter of 74.5% and a color difference of 16.7 and with the ink of Comparative Example 3 having a residual rate of coloring matter of 83.9% and a color difference of 9.5.

In addition, as is clear from Table 6, in (H) solubility test, C.I. Direct Yellow 132 used in Comparative Example 1 has a solubility in water of 50 g/L or more and below 100 g/L, while the coloring matter compound used in each Example has a solubility in water of 100 g/L or more showing a water-solubility much higher than Comparative Example 1.

Judging from the above mentioned results, the ink of each Example has the same excellent fastness as Comparative Example 2 and further a more excellent color density than Comparative Example 2, and shows better results than Comparative Example 1 in the tests of moisture fastness, light fastness, ozone fastness and solubility and than Comparative Example 3 in the tests of ozone fastness and light fastness.

Judging from the above results, the water-soluble azo compound of the present invention is suitable for preparation of ink compositions for inkjet recording, extremely excellent in various fastnesses such as moisture fastness, light fastness, ozone gas fastness and nitrogen oxide gas fastness, high in water-solubility, and stable due to being free from precipitation or gelation even when stored for a long period of time. In addition, the azo compound of the present invention has a high color density and a good vivid hue. Judging from these characteristics, it is clear that the azo compound of the present invention is a very useful compound as an ink coloring matter for various recordings, especially as a yellow coloring matter for inkjet ink.

The invention claimed is:

1. A water-soluble azo compound represented by the following formula (1):

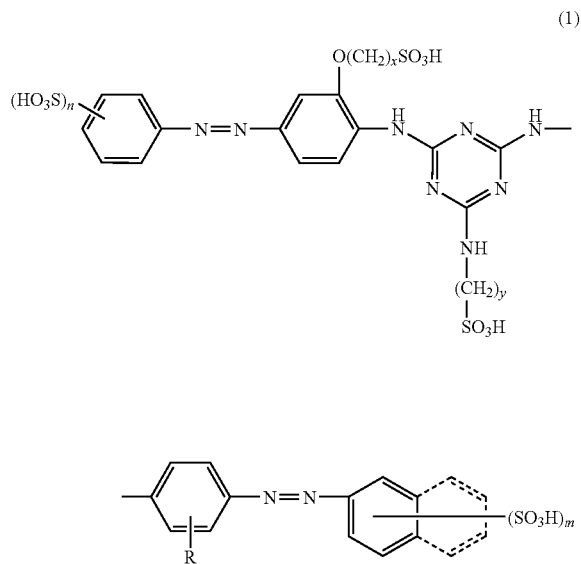

(wherein, R represents a hydrogen atom, an alkyl group having 1 to 4 carbon atoms, an alkoxy group having 1 to 4 carbon atoms or a sulfo group, n represents an integer number of 1 or 2, m represents an integer number of 1 to 3, x represents an integer number of 2 to 4 and y represents an integer number of 1 to 3, respectively) or a salt thereof.

2. The water-soluble azo compound or the salt thereof according to claim 1, which is represented by the following formula (2):

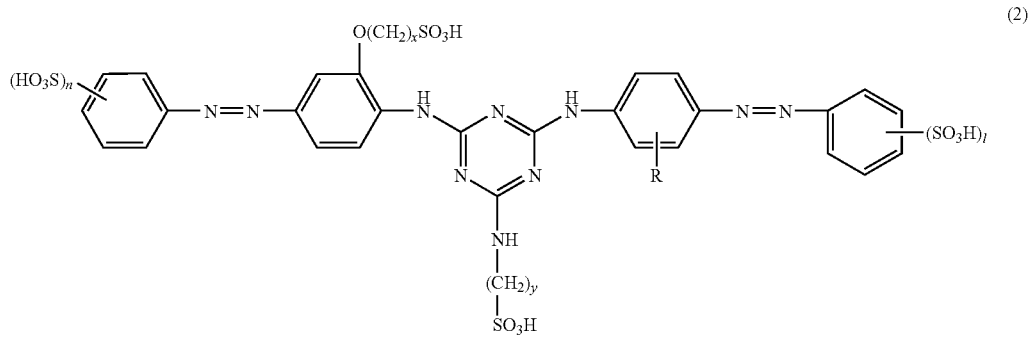

(wherein, R represents a hydrogen atom, an alkyl group having 1 to 4 carbon atoms, an alkoxy group having 1 to 4 carbon atoms or a sulfo group, n represents an integer number of 1 or 2, l represents an integer number of 1 or 2, x represents an integer number of 2 to 4 and y represents an integer number of 1 to 3, respectively).

3. The water-soluble azo compound or the salt thereof according to claim 2, wherein in the formula (2), R is a hydrogen atom, a methyl group, a methoxy group or a sulfo group, l is 1 or 2, n is 1, x is 3 and y is 2.

4. The water-soluble azo compound or the salt thereof according to claim 2, which is represented by the following formula (3):

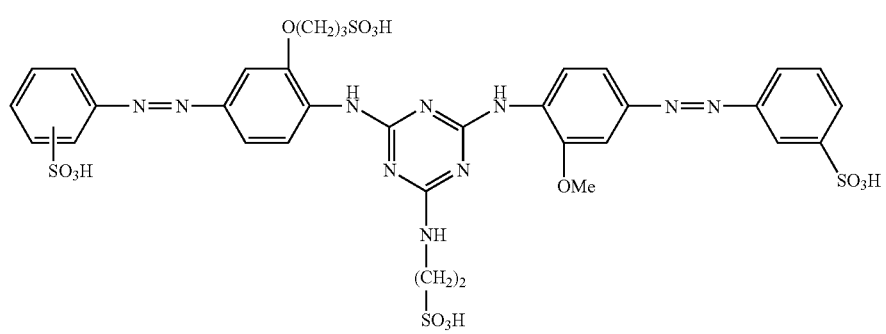

(3)

(wherein, OMe represents a methoxy group).

5. An ink composition containing the water-soluble azo compound or the salt thereof according to any one of claims 1 to 4.

6. The ink composition according to claim 5, which contains a water-soluble organic solvent.

7. The ink composition according to claim 5 or 6, which is for inkjet recording.

8. An inkjet recording method comprising discharging ink droplets of an ink composition according to claim 7 in response to recording signals to conduct recording on a record-receiving material.

9. The inkjet recording method according to claim 8, wherein the record-receiving material is a communication sheet.

10. The inkjet recording method according to claim 9, wherein the communication sheet is a sheet having an ink receiving layer containing a porous white inorganic substance.

11. A colored product colored with the water-soluble azo compound according to any one of claims 1 to 4 or the ink composition comprising said water-soluble azo compound.

12. The colored product according to claim 11, wherein coloring is performed by an inkjet printer.

13. An inkjet printer wherein a container containing the ink composition according to claim 7 is installed.

14. The water-soluble azo compound or the salt thereof according to claim 1, wherein in claim 1, the phenyl group having a condensed ring shown by a dotted line which is substituted by $(SO_3H)m$ is a 2-naphthyl group.

* * * * *